(12) United States Patent
Cogan

(10) Patent No.: US 12,008,691 B2
(45) Date of Patent: *Jun. 11, 2024

(54) SYSTEMS AND METHODS FOR CLIPPING IMAGES

(71) Applicant: PTI Marketing Technologies Inc., Solana Beach, CA (US)

(72) Inventor: Douglas Neal Cogan, Brookfield, IL (US)

(73) Assignee: PTI Marketing Technologies Inc., Solana Beach, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/092,687

(22) Filed: Nov. 9, 2020

(65) Prior Publication Data

US 2021/0125386 A1    Apr. 29, 2021

Related U.S. Application Data

(63) Continuation of application No. 15/936,291, filed on Mar. 26, 2018, now Pat. No. 10,832,453.

(Continued)

(51) Int. Cl.
*G06T 11/20* (2006.01)
*G06F 16/50* (2019.01)
(Continued)

(52) U.S. Cl.
CPC ............ *G06T 11/203* (2013.01); *G06F 16/50* (2019.01); *G06K 15/1867* (2013.01); *G06T 7/13* (2017.01); *G06T 11/60* (2013.01)

(58) Field of Classification Search
CPC ... G06T 11/60; G06T 7/13; G06T 7/10; G06T 7/11; G06T 7/12; G06T 7/181; G06T 7/187; G06T 7/162; G06F 16/50; G06F 16/55

(Continued)

(56) References Cited

U.S. PATENT DOCUMENTS

| 4,839,829 A | 6/1989 | Freedman |
| 5,367,619 A | 11/1994 | Dipaolo et al. |

(Continued)

FOREIGN PATENT DOCUMENTS

| JP | H118754 A | 1/1999 |
| JP | H11328380 A | 11/1999 |

(Continued)

OTHER PUBLICATIONS

Smith, J. et al."Create Clipping Paths in Photoshop CS5, "[Online] Retrieved from the Internet: <URL:https://www.dummies.con/software/adobe/photoshop/create-clipping-paths-in-photoshop-cs5/>, Retrieved from the Internet on: Mar. 11, 2016 (as per citation in parent applicaton) (Year: 2016).*

(Continued)

*Primary Examiner* — Andrae S Allison
(74) *Attorney, Agent, or Firm* — Cooley LLP

(57) ABSTRACT

Systems and methods for providing clipping paths for variable data publishing are disclosed. A clipping path element is part of a graphic editor that allows a user to define a clipping path in any shape including non-rectangular shapes and shapes made with curved segments. The original graphic is preserved, and the clipping frame defines the portion of the image that is displayed or printed. A plurality of clipping paths can be defined and stored to a library. Rules based on nonvariable or variable data publishing data may be used to retrieve the clipping paths from the library. A new document is composed and rendered that includes a clipping path applied to a portion of an image or the text.

22 Claims, 11 Drawing Sheets

Related U.S. Application Data

(60) Provisional application No. 62/476,395, filed on Mar. 24, 2017.

(51) Int. Cl.
*G06K 15/02* (2006.01)
*G06T 7/13* (2017.01)
*G06T 11/60* (2006.01)

(58) Field of Classification Search
USPC ........ 382/173, 180, 217–221, 215, 298–300, 382/209; 715/221–226, 233–237
See application file for complete search history.

(56) References Cited

U.S. PATENT DOCUMENTS

| | | | | |
|---|---|---|---|---|
| 5,475,805 | A * | 12/1995 | Murata | G06F 40/106 715/201 |
| 5,745,712 | A | 4/1998 | Turpin et al. | |
| 5,758,126 | A | 5/1998 | Daniels et al. | |
| 5,831,632 | A * | 11/1998 | Schuster | G06T 11/60 345/441 |
| 5,842,178 | A | 11/1998 | Giovannoli | |
| 5,911,141 | A | 6/1999 | Kelley et al. | |
| 5,963,939 | A | 10/1999 | McCann et al. | |
| 6,049,390 | A * | 4/2000 | Notredame | G06K 15/00 358/1.15 |
| 6,182,078 | B1 | 1/2001 | Whitmyer, Jr. | |
| 6,199,079 | B1 | 3/2001 | Gupta et al. | |
| 6,460,072 | B1 | 10/2002 | Arnold et al. | |
| 6,848,082 | B1 * | 1/2005 | Patel | G06T 19/003 715/848 |
| 7,765,480 | B2 | 7/2010 | Hasegawa et al. | |
| 8,233,164 | B2 | 7/2012 | Matsuda | |
| 9,063,921 | B1 * | 6/2015 | Cogan | G06F 40/103 |
| 9,158,485 | B2 | 10/2015 | Orikasa | |
| 10,832,453 | B2 * | 11/2020 | Cogan | G06T 11/203 |
| 2006/0203294 | A1 * | 9/2006 | Makino | G06T 11/60 358/400 |
| 2006/0259590 | A1 | 11/2006 | Tsai et al. | |
| 2007/0055925 | A1 * | 3/2007 | Giannetti | G06F 40/143 715/246 |
| 2008/0155394 | A1 * | 6/2008 | Sellman | G06F 40/186 715/235 |
| 2009/0257084 | A1 | 10/2009 | Sakamoto | |
| 2010/0302594 | A1 | 12/2010 | Chapman et al. | |
| 2011/0255103 | A1 | 10/2011 | Matsuda | |
| 2014/0313659 | A1 * | 10/2014 | Trachtenberg | H04N 21/2541 361/679.31 |
| 2015/0116744 | A1 * | 4/2015 | Bouche | G06F 3/1244 358/1.13 |
| 2015/0339530 | A1 * | 11/2015 | Neckels | G01C 11/02 382/113 |
| 2016/0103639 | A1 * | 4/2016 | Cogan | G06F 3/1245 347/110 |
| 2016/0342312 | A1 * | 11/2016 | Jiang | G06F 3/04815 |
| 2018/0286090 | A1 | 10/2018 | Cogan | |

FOREIGN PATENT DOCUMENTS

| | | |
|---|---|---|
| JP | 2009140295 A | 6/2009 |
| JP | 2009260575 A | 11/2009 |
| JP | 2010279038 A | 12/2010 |
| JP | 2011084045 A | 4/2011 |
| JP | 2013132038 A | 7/2013 |
| JP | 2013-186743 | 9/2013 |
| WO | WO-2018176040 | 9/2018 |

OTHER PUBLICATIONS

International Search Report and Written Opinion for International Application No. PCT/US2018/024372, dated Aug. 3, 2018, 12 pages.

\* cited by examiner

SYSTEMS AND METHODS FOR CLIPPING IMAGES

CROSS-REFERENCE TO RELATED APPLICATIONS

This application is a continuation of U.S. Non-Provisional patent application Ser. No. 15/936,291, filed on Mar. 26, 2018, entitled SYSTEMS AND METHODS FOR CLIPPING IMAGES, which claims priority to and the benefit of U.S. Provisional Patent Application Ser. No. 62/476,395, filed Mar. 24, 2017, entitled "SYSTEMS AND METHODS FOR CLIPPING IMAGES," the disclosures of which are hereby incorporated by reference in their entirety, the content of which are hereby incorporated by reference herein in its entirety for all purposes.

This application is related to U.S. patent application Ser. No. 11/200,861, entitled SYSTEM & METHOD FOR DISTRIBUTED DESIGN OF A VARIABLE DATA PUBLICATION, filed on Aug. 10, 2005, the content of which is hereby incorporated by reference herein in its entirety for all purposes. This application is also related to U.S. patent application Ser. No. 12/534,717, entitled APPARATUS & METHODS FOR IMAGE PROCESSING OPTIMIZATION FOR VARIABLE DATA PRINTING, filed on Aug. 3, 2009, the content of which is hereby incorporated by reference herein in its entirety for all purposes.

FIELD OF THE INVENTION

The present disclosure generally relates to customized digital printing and, more particularly, to aspects of variable data printing.

BACKGROUND

As printing technologies migrate from traditional printing methods such as lithography to digital printing, use of digital printers and associated processing of printed images and page layouts in digital printing systems has dramatically increased. While traditional printing methods may still be more cost effective for large quantities of standardized print on a single page size, the cost of digital printing systems and associated media has continued to decrease, making digital printing more affordable. In addition, digital printing technology can often facilitate customized printing in a more cost-effective way that traditional high volume printing methods.

For example, one type of customized printing is known as variable-data printing (VDP) (also known as variable-information printing or VIP or VI or variable-data publishing). VDP is a form of on-demand printing in which elements such as text, graphics and images may be changed from one printed piece to the next, without stopping or slowing down the printing process and without using information from a database or external file. For example, a set of personalized letters, each with the same basic layout, can be printed with a different name and address on each letter, while retaining other common elements, such as images, text, associated drop shadows, or other common elements. Variable data printing is typically used for direct marketing, customer relationship management, advertising and invoicing on self-mailers, brochures, or postcard campaigns, but may also be used for a range of other printing applications where customization is required. An article describing VDP entitled "Speaking in Tongues: Sorting Out Variable Data Printing Languages" by Eliot Harper, incorporated by reference herein, is available at www.fujixerox.com.au/products/image/media/TSR-0906-Speak-Tongues-reprint.pdf. VDP printing may be implemented using a language such as Personalized Print Markup Language or PPML, which is described in an article entitled "Introduction to the Personalized Print Markup Language: The PPML Family of XML Standards, available at www.standards.podi.org, explains how PPML can be used to implement VDP by caching images and reusing them.

VDP is a direct outgrowth of digital printing technology, which harnesses computer systems, digital printing devices, and specialized software to create high-quality black and white or full color documents with a look and feel comparable to conventional offset printing. VDP enables the mass customization of documents via digital print technology, as opposed to the mass-production of a single document using offset lithography. For example, instead of producing 10,000 copies of a single document to deliver a single message to 10,000 customers, variable data printing provides for printing 10,000 unique documents with customized messages for each customer.

VDP traditionally involves replacing text, graphics and images from one printed piece to the next. For example, a name and address may be replaced with another name and address in a promotional letter. Both names and addresses occupy the same portion of the template and the other portions of the template remain unchanged from one document to the next. With traditional VDP, the layout of the template typically does not change from one printed piece to the next, only the content of each printed piece changes.

When a graphic is used within a traditional VDP layout, sometimes the graphic must be resized or a portion of the graphic must be clipped to fit within the graphic frame of the layout. Traditionally, graphics are clipped or cropped using a rectangular frame that is resizable in different rectangular aspect ratios by the user. When a graphic is clipped, the entire graphic is still present, although only a portion of the graphic is actually visible within a clipped frame.

SUMMARY

The present disclosure relates to systems and methods for creating and applying clipping paths to a variable graphic resource within a VDP document. In some embodiments, a plurality of clipping paths are predefined and stored in a library. In some embodiments, a user defines a plurality of clipping paths and stores them to a library. In some embodiments, a library contains a plurality of user defined clipping paths and a plurality of predefined clipping paths. Each clipping path may include additional parameters such as settings for wrapping text within the borders of the clipping path or wrapping text outside of the borders of the clipping path.

In some embodiments, a set of rules determine which clipping path is retrieved from a library. In some embodiments, the clipping path is determined by a rule that uses other variable data as an input. For example, a rule may be used to read and correlate variable text which includes reading a person's name. Based on the probability of a person's name corresponding to a particular gender, the rule specifies the clipping path to be used. In other examples, the variable text is a person's address, a person's age, a person's known purchases and/or a person's known preferences. In some embodiments, the rule analyzes multiple variable data objects to select a clipping path.

In some embodiments, the clipping path is determined by a rule that uses nonvariable data as an input. For example, the clipping path may be determined by a rule that reads a customer's membership status and clips an image as a circle for lower-level customers and clips it in a starburst shape for higher-level customers. In other examples, nonvariable data is an aspect ratio of the printed document or the time of year corresponding to the printing of the document. In some embodiments, the nonvariable data input is a dimension of the layout, and/or a color associated with the layout. In some embodiments, the clipping path is determined by a rule that uses both variable and nonvariable data as inputs. In some embodiments, the clipping path is determined by the selection of a letter. For example, a clipping path may be dynamically generated by the selecting a letter of a word, e.g. an person's initial or the first letter of a paragraph. In these examples of a data-driven clipping path, the data drives the clipping path. In some embodiments, the clipping path is determined by the selection of an object in a picture. For example, clipping path may be dynamically generated by the selecting an apple positioned on a table in a picture.

In one aspect, a method for creating a composite image includes retrieving a clipping path. The clipping path has a plurality of interconnected lines and vertices that defines a border. The method includes creating a variable data publishing template layout. The variable data publishing template layout can have at least one variable data publishing field and a plurality of images. The method also includes generating the composite image. The composite image includes a portion of a plurality of images. The portion of the plurality of images defined by the clipping path. The method also includes composing a print file from a data file, the variable data template layout including the composite image, and composition options. The method also includes rendering a final document including the composite image and the at least one variable data publishing field.

In another aspect, the method further includes defining the clipping path. In another aspect, the method further includes storing the clipping path from the library. The library can be a remote database assessable over a wide area network. The border defined by custom clipping can form an irregular polygon. The border defined by the clipping path can form a polygon that is not a rectangle. The border defined by the clipping path can include at least one Bézier curved line. The variable data publishing template layout can include at least one variable data publishing field. The at least one variable data publishing field can be populated with data from the data file during composing the print file. The plurality of images can be stored in a remote image database assessable over a wide area network. The step of defining the clipping path can performed using a graphic editor on a typesetter system. The step of creating the variable data publishing template layout can be performed using the graphic editor on the typesetter system. The step of composing the print file from the data file, the variable data template layout including the composite image, and the composition options can be performed using a composition engine.

In another aspect, the method further includes sending the data file, the variable data template layout including the composite image, and composition options to the composition engine from the typesetter system. The step of rendering the final document including the composite image and the at least one variable data publishing field can include printing the final document on printable media using a printing system. The step of rendering the final document including the composite image and the at least one variable data publishing field can alternatively include displaying the final document on a display device. The step of generating the composite image further includes flattening the composite image. The print file includes one or more pre-rasterized objects and can be in the form of Java, C, C#, C++, scripting languages, PostScript, PDF, PDF/VT, PPML, XML, VPS, VDX, VIPP file, and other VDP output formats.

In another aspect, the method further includes rasterizing the one or more pre-rasterized objects using a raster image processor. The variable data publishing template layout can include a graphic frame. The graphic frame contains the composite image.

In another aspect, the present disclosure relates to a method for creating a composite image. The method includes selecting a plurality of images. The plurality of images can be stored in a database. The method also includes overlaying the plurality of images in a graphic editor. A first portion of the plurality of images can overlap with a second portion of the plurality of images. The method also includes retrieving a clipping path from a library. The clipping path can have plurality of interconnected lines and vertices that defines a border. The method also includes aligning the clipping path and the plurality of images in the graphic editor. The method also includes generating the composite image in the graphic editor. The composite image can include a combination of at least the first portion of the plurality of images and at least the second portion the plurality of images. The composite image can have at least one border defined by the clipping path.

In another aspect, the method further includes storing the clipping path to the library. In another aspect, the method further includes adjusting the clipping path retrieved from the library. The library can be a remote database assessable over a wide area network. The border defined by custom clipping can form an irregular polygon. The border defined by the clipping path can form a polygon that is not a rectangle. The border defined by the clipping path can include at least one Bézier curved line.

In another aspect, the method further includes creating a variable data publishing template layout. The variable data publishing template layout having at least one variable data publishing field and a graphic frame. The step of overlaying the plurality of images in the graphic editor can include overlaying the plurality of images within the graphic frame in the graphic editor.

In another aspect, the method further includes composing a print file from a data file, the variable data template layout including the composite image, and composition options. The at least one variable data publishing field can be populated with data from the data file during composing the print file. The step of composing the print file from the data file, the variable data template layout including the composite image, and the composition options can be performed using a composition engine. The graphic editor can be loaded into a memory of a typesetter system.

In another aspect, the method further includes sending the data file, the variable data template layout including the composite image, and the composition options to the composition engine from the typesetter system. In another aspect, the method further includes rendering a final document including the composite image and at least one variable data publishing field includes printing the final document on printable media using a printing system. In another aspect, the method further includes rendering a final document including the composite image and at least one variable data publishing field includes displaying the final document on a display device. The print file can include one or more pre-rasterized objects and can be in the form of Java, C, C#, C++, scripting languages, PostScript, PDF, PDF/VT, PPML, XML, VPS, VDX, VIPP file, and other VDP output formats. In another aspect, the method further includes rasterizing the one or more pre-rasterized objects using a raster image processor. The plurality of images stored in the database can be stored in a remote image database assessable over a wide area network. The graphic editor can be loaded into a memory of a composition system. The step of generating the composite image in the graphic editor can include flattening the composite image.

In another aspect, the present disclosure relates to a method for creating a composite image. The method includes loading a graphic editor into a memory of a composition system. The method also includes defining, using the graphic editor loaded into the memory of the composition system, a clipping path for a graphic frame, the clipping path having plurality of interconnected lines and vertices that define a border. The method also includes specifying clipping information for the graphic frame. The clipping information can include an order for overlaying a plurality of images within the graphic frame. The method also includes providing a database of variable data publishing data for composition. The method also includes merging the plurality of images within the graphic frame by retrieving the plurality of images from the database and overlaying the plurality of images in the order specified by the clipping information. The method also includes clipping the plurality of images within the graphic frame based on the clipping path of the graphic frame. The method also includes generating the composite image. The composite image can include a portion of a plurality of images, the portion of the plurality of images defined in part by the clipping path.

In another aspect, the method further includes storing the clipping path in a library. The database of variable data publishing data for composition can be a first database of variable data publishing data for composition. The method includes providing a second database of variable data publishing data for composition. The step of merging the plurality of images within the graphic frame by retrieving the plurality of images from the database can include merging graphics from the first database and the second database to the graphic frame.

In another aspect, the method further includes selecting a clipping path for each graphic frame based on the clipping information for the graphic frame. The step of selecting the clipping path for each graphic frame based on the clipping information for the graphic frame can include executing a script indicating which clipping path to select from the library. The step of executing the script indicating which clipping path to select from the library can include analyzing a plurality of variable data publishing data to select the clipping path. The clipping path can be a variable data publishing field. The step of providing the database of variable data publishing data for composition can include providing the plurality of images. The step of providing the database of variable data publishing data for composition can include specifying a link to a remote database.

In another aspect, the method further includes adjusting the clipping path retrieved from a library. The library can be a remote database assessable over a wide area network. The border defined by custom clipping can form an irregular polygon. The border defined by the clipping path can form a polygon that is not a rectangle. The border defined by the clipping path can include at least one Bézier curved line. The database of variable data publishing data for composition can be a remote image database assessable over a wide area network. The composition system can include a typesetter system. The graphic editor can be loaded into a memory of the typesetter system.

In another aspect, the method further includes creating a variable data publishing template layout. The variable data publishing template layout can have at least one variable data publishing field and the graphic frame. The step of overlaying the plurality of images in the order specified by the clipping information can include overlaying the plurality of images within the graphic frame in the graphic editor.

In another aspect, the method further includes composing a print file from a data file, the variable data template layout including the composite image, and composition options. The at least one variable data publishing field can be populated with data from the data file during composing the print file. The step of composing the print file from the data file, the variable data template layout including the composite image, and the composition options can be performed using a composition engine. The print file can include one or more pre-rasterized objects and can be in the form of Java, C, C#, C++, scripting languages, PostScript, PDF, PDF/VT, PPML, XML, VPS, VDX, VIPP file, and other VDP output formats.

In another aspect, the method further includes rasterizing the one or more pre-rasterized objects using a raster image processor. In another aspect, the method further includes sending the data file, the variable data template layout including the composite image, and the composition options to the composition engine from the typesetter system. In another aspect, the method further includes rendering a final document including the composite image and at least one variable data publishing field includes printing the final document on printable media using a printing system. In another aspect, the method alternatively includes rendering a final document including the composite image and at least one variable data publishing field includes displaying the final document on a display device. The step of generating the composite image in the graphic editor can further include flattening the composite image.

In another aspect, the present disclosure relates to a system for creating a composite image. The system includes a composition subsystem. The composition subsystem can be configured for defining a clipping path. The clipping path can have a plurality of interconnected lines and vertices that defines a border. The composition subsystem can also be configured for creating a variable data publishing template layout. The variable data publishing template layout can have at least one variable data publishing field and a plurality of images. The composition subsystem can also be configured for generating the composite image. The composite image can include a portion of a plurality of images. The portion of the plurality of images can be defined by the clipping path. The composition subsystem can also be configured for composing a print file from a data file. The variable data template layout can include the composite image, and composition options. The print file can also include one or more pre-rasterized objects. The system also includes a processor configured for rasterizing the one or more pre-rasterized objects. The system also includes a printing subsystem configured for rendering a final document including the composite image and the at least one variable data publishing field.

In another aspect, the system further includes a database configured for storing the clipping path. The composition subsystem is also configured for retrieving the clipping path from the database. The database can be a remote database assessable over a wide area network. The border defined by custom clipping can form an irregular polygon. The border defined by the clipping path can form a polygon that is not a rectangle. The border defined by the clipping path can include at least one Bézier curved line. The variable data publishing template layout can include at least one variable data publishing field. The at least one variable data publishing field can be populated with data from the data file during composing the print file. The plurality of images can be stored in a remote image database assessable over a wide area network.

In another aspect, the system further includes a typesetter system and a composition engine. The typesetter system can be configured for defining the clipping path using a graphic editor on the typesetter system. The step of creating the variable data publishing template layout can performed using the graphic editor on the typesetter system. The step of composing the print file from the data file, the variable data template layout including the composite image, and the composition options can be performed using the composition engine. The typesetter system is configured for sending the data file, the variable data template layout including the composite image, and composition options to the composition engine. The step of rendering the final document including the composite image and the at least one variable data publishing field can include printing the final document on printable media using the printing system. The step of rendering the final document including the composite image and the at least one variable data publishing field can alternatively include displaying the final document on a display device of the printing subsystem. The step of generating the composite image can further include flattening the composite image. The print file can be in the form of a Java, C, C#, C++, scripting languages, PostScript, PDF, PDF/VT, PPML, XML, VPS, VDX, or VIPP file. The variable data publishing template layout can include a graphic frame. The graphic frame can contain the composite image.

In another aspect, the present disclosure relates to a system for creating a composite image. The system includes a composition subsystem. The composition subsystem can be configured for selecting a plurality of images, the plurality of images being stored in a database. The composition subsystem can also be configured for overlaying the plurality of images in a graphic editor. A first portion of the plurality of images can overlap with a second portion of the plurality of images. The composition subsystem can also be configured for retrieving a clipping path from a library. The clipping path can have a plurality of interconnected lines and vertices that defines a border. The composition subsystem can also be configured for aligning the clipping path and the plurality of images in the graphic editor. The composition subsystem can also be configured for generating the composite image in the graphic editor. The composite image can include a combination of at least the first portion of the plurality of images and at least the second portion the plurality of images. The composite image can have at least one border defined by the clipping path.

In another aspect, the system further includes a database configured for storing the clipping path. The composition subsystem can be configured for retrieving the clipping path from the database. The database can be a remote database assessable over a wide area network. The border defined by clipping path can form an irregular polygon. The border defined by the clipping path can form a polygon that is not a rectangle. The border defined by the clipping path can include at least one Bézier curved line.

The composition subsystem can be further configured for creating a variable data publishing template layout. The variable data publishing template layout can have at least one variable data publishing field and a graphic frame. The composition subsystem can be further configured for overlaying the plurality of images in the graphic editor includes overlaying the plurality of images within the graphic frame in the graphic editor. The composition subsystem can be further configured for composing a print file from a data file, the variable data template layout including the composite image, and composition options. The at least one variable data publishing field can be populated with data from the data file during composing the print file.

The composition subsystem can further include a typesetter system and a composition engine. The composition engine can be configured for composing the print file from the data file. The variable data template layout can include the composite image and the composition options. The graphic editor can be loaded into a memory of the typesetter system. The composition subsystem can be further configured for sending the data file, the variable data template layout including the composite image, and the composition options to the composition engine from the typesetter system.

In another aspect, the system further includes a printing system. The printing system can be configured for rendering a final document including the composite image and the at least one variable data publishing field. Rendering the final document can include printing the final document on printable media.

In another aspect, the system further includes a display device, the display device can be configured for rendering a final document including the composite image and at least one variable data publishing field. Rendering the final document can include displaying the final document.

In another aspect, the system further includes a raster image processor. The raster image processor configured for rasterizing one or more pre-rasterized objects. The print file can include one or more pre-rasterized objects and the print file is in the form of Java, C, C#, C++, scripting languages, PostScript, PDF, PDF/VT, PPML, XML, VPS, VDX, VIPP file, and other VDP output formats. The plurality of images being stored in the database can be stored in a remote image database assessable over a wide area network. The graphic editor can be loaded into a memory of the composition subsystem. The step of generating the composite image in the graphic editor can further include flattening the composite image.

In another aspect, the present disclosure relates to a system for creating a composite image. The system includes a database. The database can be configured for providing variable data publishing data for composition. The system also includes a composition subsystem. The composition subsystem can configured for loading a graphic editor into a memory of the composition subsystem. The composition subsystem can also be configured for defining, using the graphic editor loaded into the memory of the composition subsystem, a clipping path for a graphic frame. The clipping path having plurality of interconnected lines and vertices that define a border. The composition subsystem can also be configured for specifying clipping information for the graphic frame. The clipping information can include an order for overlaying a plurality of images within the graphic frame. The composition subsystem can also be configured for merging the plurality of images within the graphic frame by retrieving the plurality of images from the database and overlaying the plurality of images in the order specified by the clipping information. The composition subsystem can also be configured for clipping the plurality of images within the graphic frame based on the clipping path of the graphic frame. The composition subsystem can also be configured for generating the composite image. The composite image including a portion of a plurality of images. The portion of the plurality of images can be defined in part by the clipping path.

In another aspect, the database of variable data publishing data for composition is a first database of variable data publishing data for composition and the system further includes a second database. The second database can be configured for providing variable data publishing data for composition of variable data publishing data for composition. The step of merging the plurality of images within the graphic frame by retrieving the plurality of images from the database can include merging graphics from the first database and the second database to the graphic frame. The composition subsystem can be configured for selecting a clipping path for each graphic frame based on the clipping information for the graphic frame. The step of selecting the clipping path for each graphic frame based on the clipping information for the graphic frame can include executing a script indicating which clipping path to select from a library. The step of executing the script indicating which clipping path to select from the library can include analyzing a plurality of variable data publishing data to select the clipping path. The clipping path can be a variable data publishing field. The step of providing the database of variable data publishing data for composition can include providing the plurality of images. The step of providing the database of variable data publishing data for composition can include specifying a link to a remote database.

The composition subsystem can also be configured for adjusting the clipping path retrieved from the library. The library can be a remote database assessable over a wide area network. The border defined by clipping path can form an irregular polygon. The border defined by the clipping path can form a polygon that is not a rectangle. The border defined by the clipping path can include at least one Bézier curved line. The database of variable data publishing data for composition can be a remote image database assessable over a wide area network.

The composition subsystem can further include a typesetter system and a composition engine. The graphic editor can be loaded into a memory of typesetter system. The composition subsystem can also be configured for creating a variable data publishing template layout. The variable data publishing template layout having at least one variable data publishing field and the graphic frame. The composition subsystem can also be configured for overlaying the plurality of images in the order specified by the clipping information including overlaying the plurality of images within the graphic frame in the graphic editor. The composition subsystem can also be configured for composing a print file from a data file. The variable data template layout can include the composite image and composition options. The at least one variable data publishing field can be populated with data from the data file during composing the print file. The step of composing the print file from the data file, the variable data template layout including the composite image, and the composition options can be performed using a composition engine.

In another aspect, the system further includes a raster image processor. The raster image processor can be configured for rasterizing one or more pre-rasterized objects. The print file can include the one or more pre-rasterized objects and can be in the form of a Java, C, C#, C++, scripting languages, PostScript, PDF, PDF/VT, PPML, XML, VPS, VDX, VIPP file, and other VDP output formats. The typesetter system can be configured for sending the data file, the variable data template layout including the composite image, and the composition options to the composition engine. The step of generating the composite image in the graphic editor can further include flattening the composite image.

In another aspect, the system further includes a printing system. The printing system can be configured for rendering a final document including the composite image and the at least one variable data publishing field. Rendering the final document can include printing the final document on printable media.

In another aspect, the system further includes a display device, the display device can be configured for rendering a final document including the composite image and at least one variable data publishing field. Rendering the final document can include displaying the final document.

In another aspect, the present disclosure relates to a non-transitory processor-readable medium containing processor executable instructions for creating a composite image. The executable instructions can include loading a graphic editor into a memory of a composition subsystem. The executable instructions can also include defining, using the graphic editor loaded into the memory of the composition subsystem, a clipping path for a graphic frame. The clipping path can have plurality of interconnected lines and vertices that define a border. The executable instructions can also include specifying clipping information for the graphic frame. The clipping information can include an order for overlaying a plurality of images within the graphic frame. The executable instructions can also include merging the plurality of images within the graphic frame by retrieving the plurality of images from the database and overlaying the plurality of images in the order specified by the clipping information. The executable instructions can also include clipping the plurality of images within the graphic frame based on the clipping path of the graphic frame. The executable instructions can also include generating the composite image. The composite image can include a portion of a plurality of images. The portion of the plurality of images can be defined in part by the clipping path.

Additional aspects of the present disclosure are further described below in conjunction with the drawings. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The following U.S. published applications are hereby incorporated herein by reference for all purposes:

Title: CENTRALIZED SYSTEM AND METHOD FOR MANAGING ENTERPRISE OPERATIONS; Application No. PCT/US99/26523; Publication No. WO 2000/030000; Application Date Nov. 9, 1999

Title: SYSTEM AND METHOD FOR CREATING, GENERATING AND PROCESSING USER-DEFINED GENERIC SPECS; application Ser. No. 09/780,099; Publication No. US 2002-0032694 A1; Application Date Feb. 9, 2001

Title: SYSTEMS & METHODS FOR PROVIDING VARIABLE DATA PRINTING (VDP) USING

DYNAMIC FONT DOWNGRADING; application Ser. No. 12/571,387; Publication No. US-2011-0075196-A1; Application Date Sep. 30, 2009

Title: SYSTEMS & METHODS FOR PROVIDING VARIABLE DATA PRINTING (VDP) USING DYNAMIC FONT DOWNGRADING; Application No. PCT/US2010/050302; Publication No. WO 2011/041241; Application Date Sep. 24, 2010

Title: SYSTEMS & METHODS FOR PROVIDING VARIABLE DATA PRINTING (VDP) USING DYNAMIC FONT DOWNGRADING; application Ser. No. 14/269,802; Publication No. US-2014/0240731-A1; Application Date May 5, 2014

Title: APPARATUS & METHODS FOR IMAGE PROCESSING OPTIMIZATION FOR VARIABLE DATA PRINTING; application Ser. No. 12/534,717; Publication No. US-2011/0026042-A1; Application Date Aug. 3, 2009

Title: APPARATUS AND METHODS FOR IMAGE PROCESSING OPTIMIZATION FOR VARIABLE DATA PRINTING (VDP); Application No. PCT/US2010/044298; Publication No. WO2011/017361; Application Date Aug. 3, 2010

Title: APPARATUS & METHODS FOR IMAGE PROCESSING OPTIMIZATION FOR VARIABLE DATA PRINTING; application Ser. No. 14/105,955; Publication No. US-2014-0104650-A1; Application Date Dec. 13, 2013

Title: SYSTEM AND METHOD FOR PRINTABLE DOCUMENT JOB SUBMISSION; application Ser. No. 13/554,344; Publication No. US-2014-0022585-A1; Application Date Jul. 20, 2012

Title: SYSTEM AND METHOD FOR PRINTABLE DOCUMENT JOB SUBMISSION; Application No. PCT/US2013/051265; Publication No. WO 2014/015249; Application Date Jul. 19, 2013

Title: SYSTEM AND METHOD FOR PRINTABLE DOCUMENT VIEWER OPTIMIZATION; application Ser. No. 13/827,173; Publication No. US-2014-0281940-A1; Application Date Mar. 14, 2013

Title: SYSTEM AND METHOD FOR PRINTABLE DOCUMENT VIEWER OPTIMIZATION; Application No. PCT/US2014/025814; Publication No. WO2014/160100; Application Date Mar. 13, 2014

BRIEF DESCRIPTION OF THE DRAWINGS

The present disclosure is more fully appreciated in connection with the following Detailed Description taken in conjunction with the accompanying drawings. The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
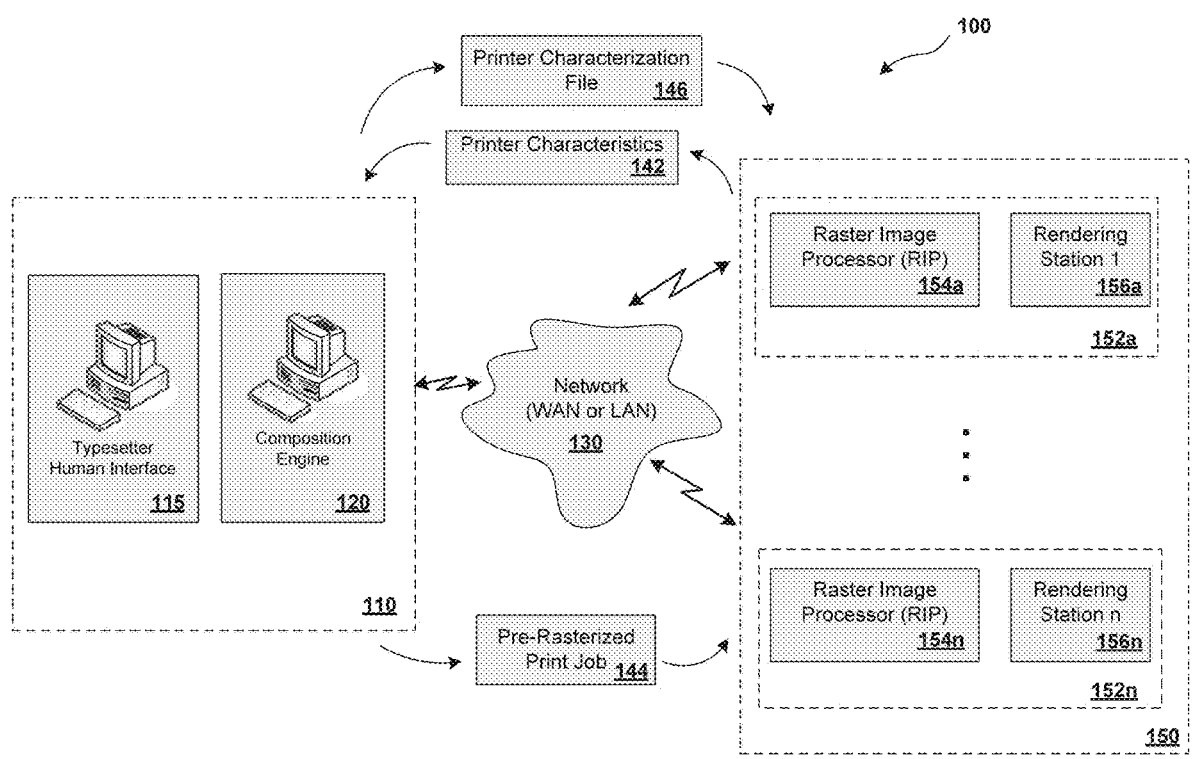
FIG. 1 is an illustration of a typical printing system on which embodiments of the present disclosure may be implemented.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Following below are more detailed descriptions of various concepts related to, and embodiments of, inventive systems and methods for creating and applying clipping paths to a variable graphic resource within a VDP document. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. Though described herein with in connection with VDP, the concepts and embodiments are also applicable to publishing using non-variable data for a variety of different page sizes.

Programs, like FusionPro available from PTI Marketing Technologies, Inc., allow a user to ultimately create a document by laying out frames on a page. The frames correspond to the positions of the various elements on the page. The elements can be graphics, text, or combinations thereof. As used herein, the terms image and graphic are used interchangeably. The elements may be stored in databases and include variable or non-variable data. After the user has laid out the frames for optimal viewing on a given page size, the user is then able to preview the page to see a representation of the finished document. In one embodiment, a user creates a variable data layout by positioning multiple frames on a page.

After laying out the initial page, the user may save the layout as a template. In one embodiment, a user saves the layout as a variable data template. The template contains information relating to the size and position for each frame on the page. The content of each frame can include non-variable or variable data. Data may be stored in a library or database and retrieved when a document is composed.

In order to further describe details of various embodiments of the present disclosure, attention is now directed to FIG. 1 which illustrates a typical digital printing system 100 on which various embodiments of the present disclosure may be implemented. Printing system 100 includes two primary sub-sections—a composition or typesetting subsection (also denoted herein as composition system, composition subsystem, or typesetter) 110 and a printing subsection (also denoted herein as a printing system) 150. These subsections may be interconnected via a network 130 as shown in FIG. 1, such as a local area network (wired LAN, such as an Ethernet or other LAN), a wireless network, a wide area network (WAN), such as the Internet, a corporate network, or via other networking configurations. In some embodiments, subsections 110 and 150 need not be directly interconnected as shown in FIG. 1, but data and information may be transferred manually between them, such as by human users or operators. Data and information transferred between subsystems 110 and 150 may include a set of printer characteristics 142, a print job 144, a printer characteristics determination file 146, as well as other data or information (not shown).

Composition subsection 110 may include two computer sub-systems 115 and 120. Sub-system 115 is denoted herein as a typesetter human interface and is typically a computer system containing hardware and software configured to receive printer characteristics 142, which include information associated with the characteristics of a particular printer system (or systems) 152, store that information in a memory, and provide connectivity facilitating access to that information to sub-system 120 or transfer the received information to sub-system 120. Sub-system 115 may also be configured to communicate directly with printing subsection 150 to generate a printer characteristics determination file 146 to query for printer characteristics 142 of one or more printers 152a-152n, and/or other information, and receive printer characteristics 142 from the printing subsection 150.

Sub-system 120 is denoted herein as a composition engine or typesetter system, and it is configured with hardware and software to allow a user to compose a print job using a printing composition or typesetting tool such as Fusion Pro or another similar or equivalent tool. In some embodiments, the components and functionality associated with typesetter human interface 115 (also denoted herein as "interface" 115 for brevity) and composition engine 120 may be combined in a single computer system rather than in the form of separate sub-systems as shown in FIG. 1. In this case, the combined system may be referred to herein merely as a typesetter or typesetter system 110.

In addition to supporting functionality associated with composition of print jobs as may be provided by an application such as Fusion Pro, composition engine 120 may also be configured to execute additional functions as may be implemented in one or more functional modules, as further described herein, to receive printer characteristics and generate one or more pre-rasterized print jobs 144 for execution on one or more printers 152a-152n of printing system 150. As used herein, a pre-rasterized print job describes a print job, typically in the form of a printer programming language such as PostScript, that includes instructions for generating the printed output along with one or more pre-rasterized objects (such as images, fonts, drop-shadows, other vector objects, etc.). Embodiments of this functionality and associated implementation details for embodiments are further described below.

Printing system 150 includes one or more printers 152a-152n and may also include other hardware or software elements (not shown). Each of these printers 152 may further be divided into a raster image processor module ("RIP") 154 and a rendering station module 156. RIP 154 is typically a computer system configured to receive a print job and generate the specific page printing bitmap or page dot pattern for rendering (i.e., generating the printed output) on rendering station 156. As is known in the art, each printer has a native output resolution or resolutions at which the printed output is generated. The printed output consists of printed dots or other very small printed features, with the dots placed on the page by a print rendering apparatus of the rendering station 156. For example, the dots may consist of inks, toners, or other print media placed on the printed page by ink jets or thermal mechanisms, at the printer's native resolution. The native resolution defines the particular dot pattern of the printed output that can be produced on the particular printer's rendering station. In effect, any raster objects of an incoming print job are converted by the RIP into a page layout in the printer's native resolution, irrespective of the specific original resolution of the object. This requires that objects such as images be converted from their initial resolution to the printer's native resolution.

In addition, the rotation of the object on the page may vary based on the particular printer's page layout, how the printed pages are configured on the printed sheet (for example, some printed pages may be oriented horizontally on the page, whereas other pages having the same content and objects may be rotated 90 degrees or 180 degrees to maximize printable area of the output), and/or based on variable rotation of printed objects, beyond just fixed +/−90 or 180 degree rotations.

When a print job is provided to the printer, such as printers 152a-152n of FIG. 1, the RIP 154 receives the print job, typically in the form of a printer programming language file such as Adobe PostScript, and generates all or part of the printed page in the native printer resolution and rotation. As noted above, this processing may include converting an object from the print job from one resolution to another, generating a raster object in the printer's native format from a vector object such as a font, drop shadow, etc., rotating objects based on the desired print orientation or rotation, and/or other processing such as is further described and illustrated herein.

To further elaborate on details of processing as may be performed by the RIP 154, a RIP is a component of a printing system that generates a rasterized page layout for printing based on an input print job. The page layout is then sent to a print rendering device, such as rendering station 156 as shown in FIG. 1, for generation of the printed output. The print job input is typically in the form of a page description in a high-level page description language such as PostScript, Portable Document Format, XPS, and the like. These print jobs include a set of programming instructions that describe how to generate the particular print job as well as specific objects (components) of the print job, such as images, fonts, drop shadows, vector elements, etc. that may be needed to produce the printed output. The RIP performs data processing to convert a print job file (such as, in an exemplary embodiment, a PostScript file) from the programming language description of the printed page to a dot pattern page layout for rendering the page in the native output resolution and rotation.

A RIP can be implemented as a software component executing on a computer system, such as RIP 156 of FIG. 1, or as a firmware or software program executed on a microprocessor, DSP, ASIC or other hardware inside a printer. RIP software may be optimized for VDP or may not be VDP-aware, depending on the type of print tasks at hand. Both types of RIP technology are widely available from software vendors such as EFI and Harlequin, and from printer vendors such as Hewlett-Packard, Nexpress/Kodak and Xerox. For high-end and intermediate digital typesetting standalone hardware RIPs are typically used. PostScript printers contain an associated PostScript RIP either in hardware/software elements or in firmware. One advantage of the present disclosure is that it operates on RIPs that are not VDP-aware such as office printer equipment made by companies such as Ricoh and Canon.

Figure 2:
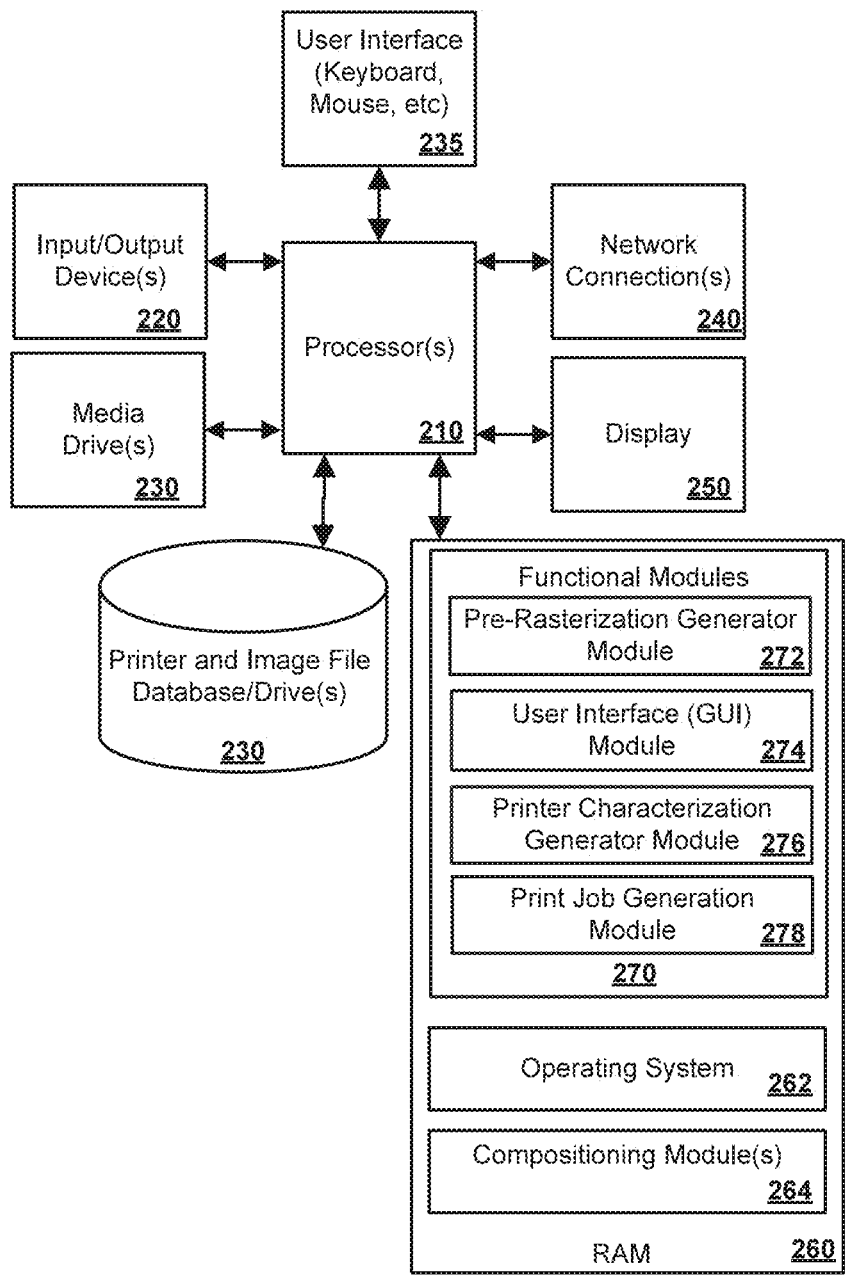
FIG. 2 is an illustration of an embodiment of a Composition/Typesetter System in accordance with aspects of the present disclosure.

Attention is now directed to FIG. 2, which illustrates a typical system configuration for a composition system or typesetting system, such as typesetter 110 as shown in FIG. 1. For purposes of brevity, the various components of FIG. 2 are shown in a simplified form, with some elements removed for purposes of clarity. For example, FIG. 2 illustrates components of a single computer system, however, two separate systems 115 and 120 may also be used as shown in FIG. 1, and/or other configurations may also be used.

Composition system 110 includes one or more processors 210, one or more memories or other program and data storage elements 260, and an image/content database 230, which may be part of memory 260. Memory 260 further includes functional modules for providing the various functionality as is described herein. These functional modules may include hardware elements, software elements, firmware elements, and/or combinations of these elements to implement various functionality. In particular, the functional modules may include a Pre-Rasterization Generator Module 272, a User Interface Module 272, a Printer Characterization Module 276, a Print Job Generator Module 278, and/or combinations of these various modules as well as other modules. In addition, memory 260 may include one or more operating systems 262 or other applications (not shown), as well as a compositioning module 264, which may be, for example, the Fusion Pro Desktop or another composition or typesetting application program. The functionality provided by the functional modules 270 may be incorporated into the compositioning module 264, such as via direct integration or via plug-ins or other incorporation mechanisms. In addition, compositioning module 264 may be a standalone application or may be integrated into another application, such as in the form of a plug-in or via other program integration mechanisms.

Composition system 110 may also include other elements such as one or more media drives 230 (removable hard disk drives, CD, DVD, BD drives, Flash memory drives, USB drives, and the like) to facilitate input, output and storage of print jobs, printer characterization data, image files and/or other data or information. In addition, composition system 110 may include one or more I/O devices 220, such as USB or Firewire interfaces, one or more user interfaces and associated hardware and/or software, such as keyboards, computer mice, trackballs, and the like, one or more network connections 240, such as wired or wireless network connections (Ethernet, Wi-Fi, etc.) to facilitate connectivity to other systems, such as printing system 150. A display 250, such as a CRT monitor, LCD monitor, or other visual output device may also be included to facilitate data and information input and output, user interface functionality, as well as to provide a composition interface and/or a display mechanism for viewing pre-rasterized page layouts or pre-rasterized objects in the printer's native resolution.

Figure 3:
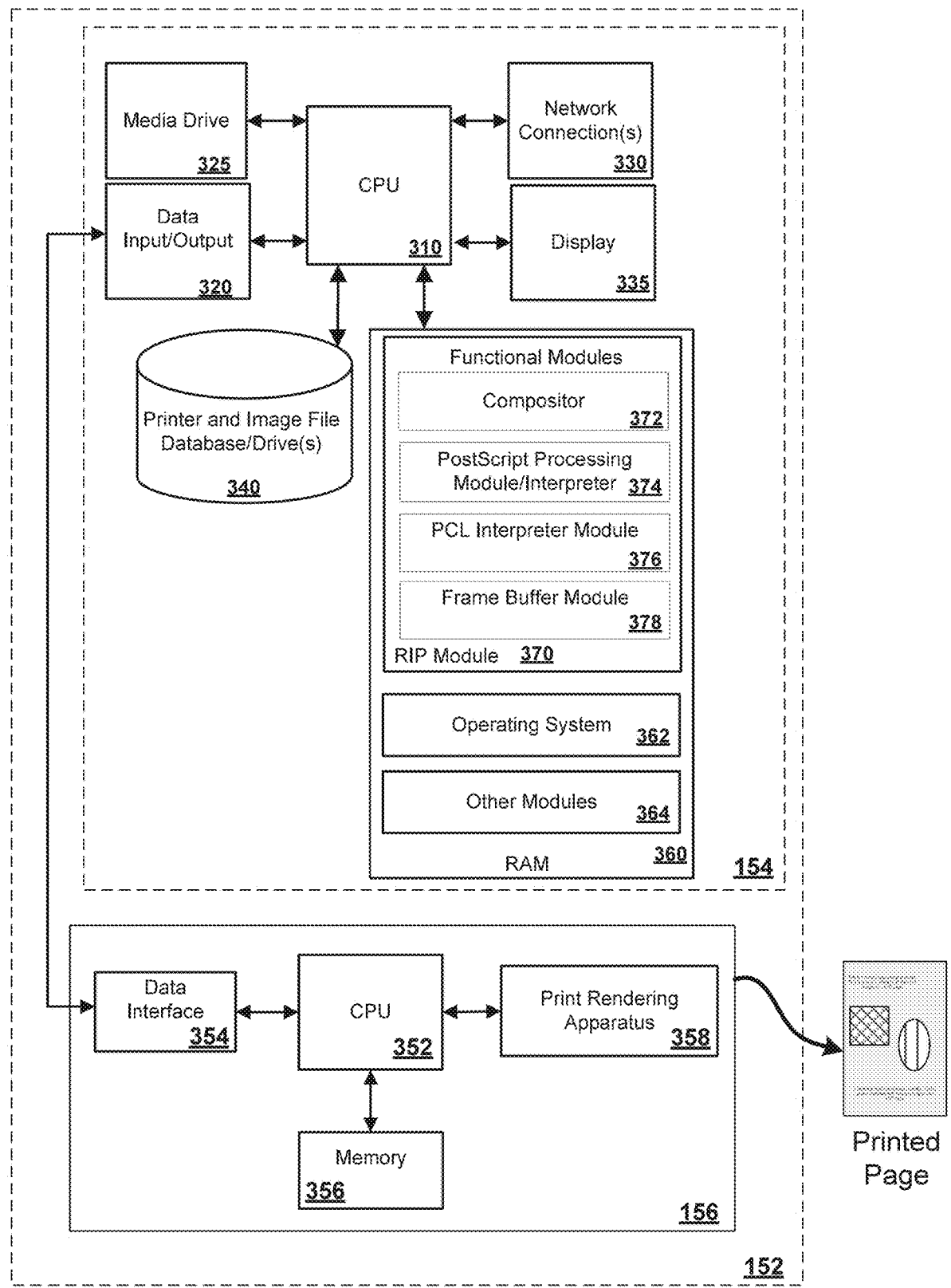
FIG. 3 is an illustration of an embodiment of a Printer System in accordance with aspects of the present disclosure.

Attention is now directed to FIG. 3 which illustrates a typical printer system configuration. Printer system 152 as shown in FIG. 3 may be a single printer or one of a plurality of printers in a printing system 150 as shown in FIG. 1. As described previously, printer system 152 includes a RIP module 154 and a rendering station module 156, and may include other elements (not shown). RIP module 154 may include one or more processors or CPU's 310, one or more data I/O modules 320 configured to interface between RIP 154 and rendering station 156, and a memory 360. Memory 360 further includes functional modules for providing the various functionality as is described herein. These functional modules may include hardware elements, software elements, firmware elements, and/or combinations of these elements to implement various functionality.

In particular, in a typical embodiment, the RIP may be in the form of a RIP software module 370 comprising a set of functional modules that may include a Compositor Module 372, one or more programming job processing modules such as a Postscript Processing Module 374, a PCL Interpreter Module 376 and/or other print job processing modules configured to generate a page layout based on a received print job. In addition, the functional modules may include page or frame buffer modules configured to store native page or frame information for transmission to the rendering station 156.

For example, frame buffer module may include a complete page in a dot pattern form that can be directly converted to printed output by the print rendering apparatus 358. Other functional modules such as operating system module 362 may also be stored in memory 360.

In addition, RIP 154 may include a database 340 that may be integrated with memory 360. Database 340 may be used to store data, information and objects such as are described herein, including pre-rasterized objects and objects provided in the print job to be rasterized by the RIP module 370. The compositor module 372 may be used for taking output from a PostScript interpreter 374 and PCL module 376 and combining them with other page elements in the frame buffer 378 to account for transparency, where supported (frame buffer 378 stores a bitmap of the printed output, and data loaded into the frame buffer as "transparent" will allow other data in the buffer at the same pixel location to show-through). RIP 154 may also include network connection module(s) 330 to facilitate network connectivity such as to typesetter 110 or to other systems or devices, as well as one or more media drives 325 (hard disk drives, CD, DVD, BD drives, Flash memory drives, USB drives, and the like) to facilitate input, output and storage of print jobs, storage and output of printer characterization data, image files and/or other data or information.

Rendering station 156 is configured to receive formatted page information, such as a page dot pattern, from RIP 154 and generate the printed output page in the print rendering apparatus 358's native resolution. While rendering stations 156 may have different configuration based on the type of printer system they are incorporated in, they will generally include at least a processor 352 or logic circuit equivalents such as a PLD, ASIC, etc., as well as memory 356 for storage of incoming data, and a print rendering apparatus 358 which generates the printed page output (such as by laser, ink jet, etc.).

Figure 4:
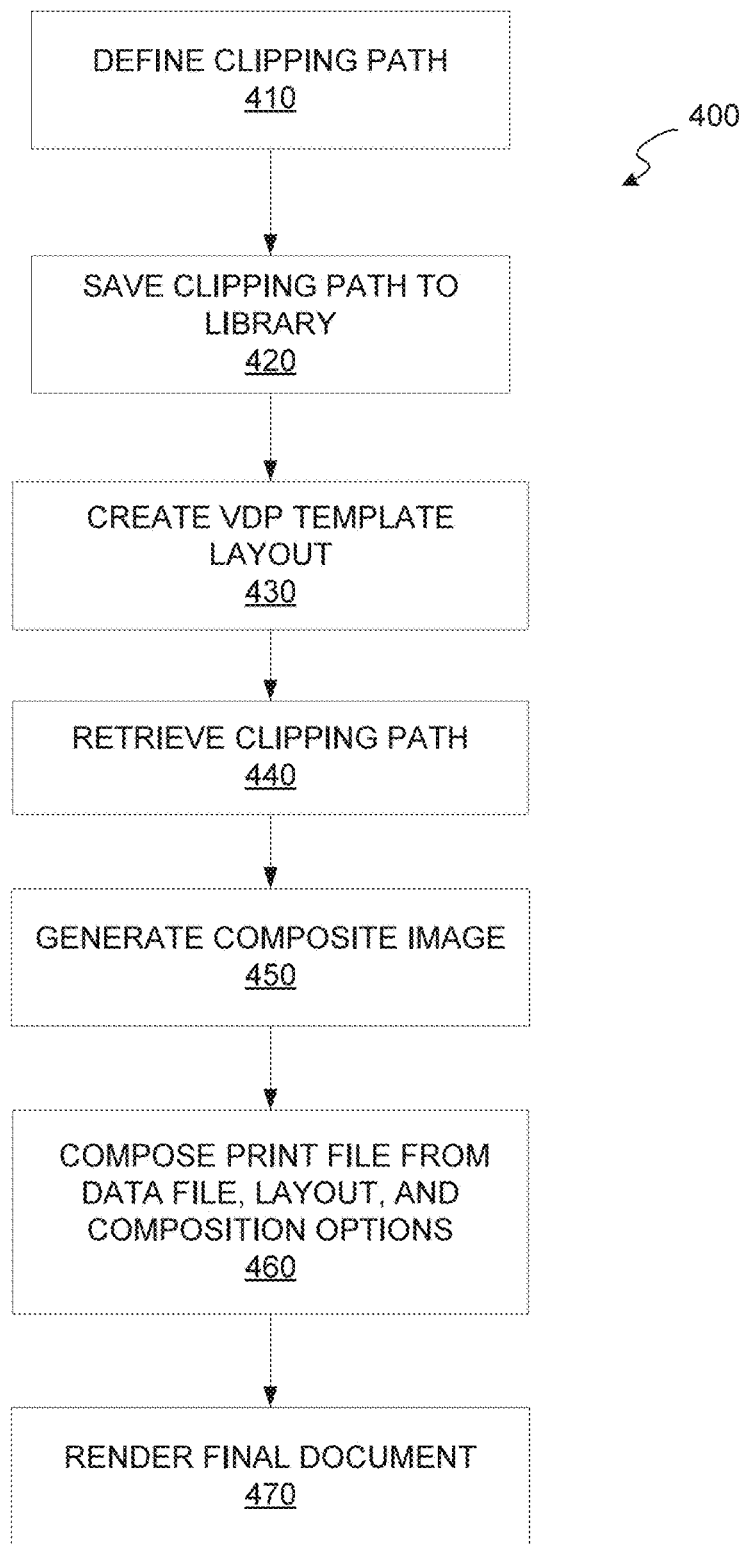
FIG. 4 is an illustration of a process for creating a document using a clipping path, according to an embodiment of the present disclosure.

FIG. 4 illustrates a method 400 for creating a document using a clipping path, according to an embodiment of the present disclosure. In step 410, a user defines a clipping path. A clipping path includes a plurality of interconnected lines and vertices that form a border, the border defining an area. The clipping path can include parts of a rectangular frame, rounded rectangular frame, or oval frame as is traditionally available in a graphic editor. However, the clipping path may also include Bézier curved lines or segments, straight lines or segments, rounded lines or segments, and combinations thereof. In this manner, the clipping path can be defined in almost any non-overlapping continuous path that defines a border of an area. In some embodiments, the clipping path is defines a polygon. In some embodiments, the clipping path defines an irregular polygon. In some embodiments, the clipping path is defines a simple polygon. In some embodiments, the clipping path is defines an irregular polygon. In some embodiments, the clipping path is defines convex polygon. In some embodiments, the clipping path is defines a concave polygon. In some embodiments, the clipping path is defines a star shaped polygon. In some embodiments, the clipping path defines a polygon that is not a rectilinear shape. In some embodiments, the clipping path defines a polygon that is not a quadrilateral. In some embodiments, the clipping path defines a polygon that is not a rectangle.

After the clipping path is defined by the user in step 410 using, for example, a graphic clipping frame editor, the clipping path can be saved to a library in step 420. In this manner, a plurality of clipping paths can be created and saved to a library for future use. By saving the clipping path for future use, the user saves time by not having to recreate the clipping path each time it is to be used within a layout. Also, a saved clipping path can be re-used an unlimited number of times and each time it can be retrieved and applied in exactly in the same shape, which provides consistency between multiple layouts, or a saved clipping path can be retrieved and the adjusted by a user based on the given layout or graphics. A clipping path can also be exported from a first library and imported into a second library. In some embodiments, the library one or more media drives (hard disk drives, CD, DVD, BD drives, Flash memory drives, USB drives, and the like). In some embodiments, the library is a remote database assessable over a WAN and/or LAN network. In some embodiments, the library is a local database assessable over a local network or a local database that is part of the composition or typesetting subsection assessable over a hardware bus.

A user creates a variable data publishing template layout in step 430. The layout can be composed of images, text, background colors, shapes, designs, and can include variable data publishing fields and non-variable data publishing fields. In some embodiments, the variable data publishing template layout includes at least one variable data publishing field. Examples of variable data that can be populated into a variable data publishing field include data typically stored in tables such as names, addresses, purchase history, birthdays, membership information, gender, group affiliations, ect. During rendering step 470, the variable data publishing field of the layout is populated with variable data from a data file.

The clipping path can be retrieved from the library in step 440, which may be stored in a memory of a database, and applied to variable and non-variable data publishing fields within the layout. For example, a clipping path can be applied to a variable data text box to only reveal a portion of the text, e.g. a portion of a prize code. In another example, a clipping path can be applied to a variable graphic box to crop the graphic so that only the portion of the graphic within the frame is visible in the final document.

In some embodiments, the clipping path is a variable data publishing field. A rule or a set of rules can be used to select a clipping path. In some embodiments, a set of rules determine which clipping path is retrieved from a library. In some embodiments, the clipping path is determined by a rule that uses other variable data as an input. For example, a rule may be used to read and correlate variable text data which includes reading a person's name. Based on the probability of a person's name corresponding to a particular gender, the rule specifies the clipping path to be used. In other examples, the variable text is a person's address, a person's age, a person's known purchases and/or a person's known preferences. In some embodiments, the rule analyzes multiple variable data objects to select a clipping path.

In step 450, the composite image showing portions of the clipped images is generated. The composite image can be generated on a typesetter and/or composition system.

The print job including the data file, layout, and composition options are sent over a local area network (wired LAN, such as an Ethernet or other LAN), a wireless network, a wide area network (WAN), such as the Internet, a corporate network, or via other networking configurations to the composition engine in step 460. The rendering station receives the print job and renders the final document in step 470. The final document can be outputted to a printer and printed on paper, film, cardboard, or other media and can be a sheet, poster, post card, flyer, pamphlet, or other document media.

Figure 5:
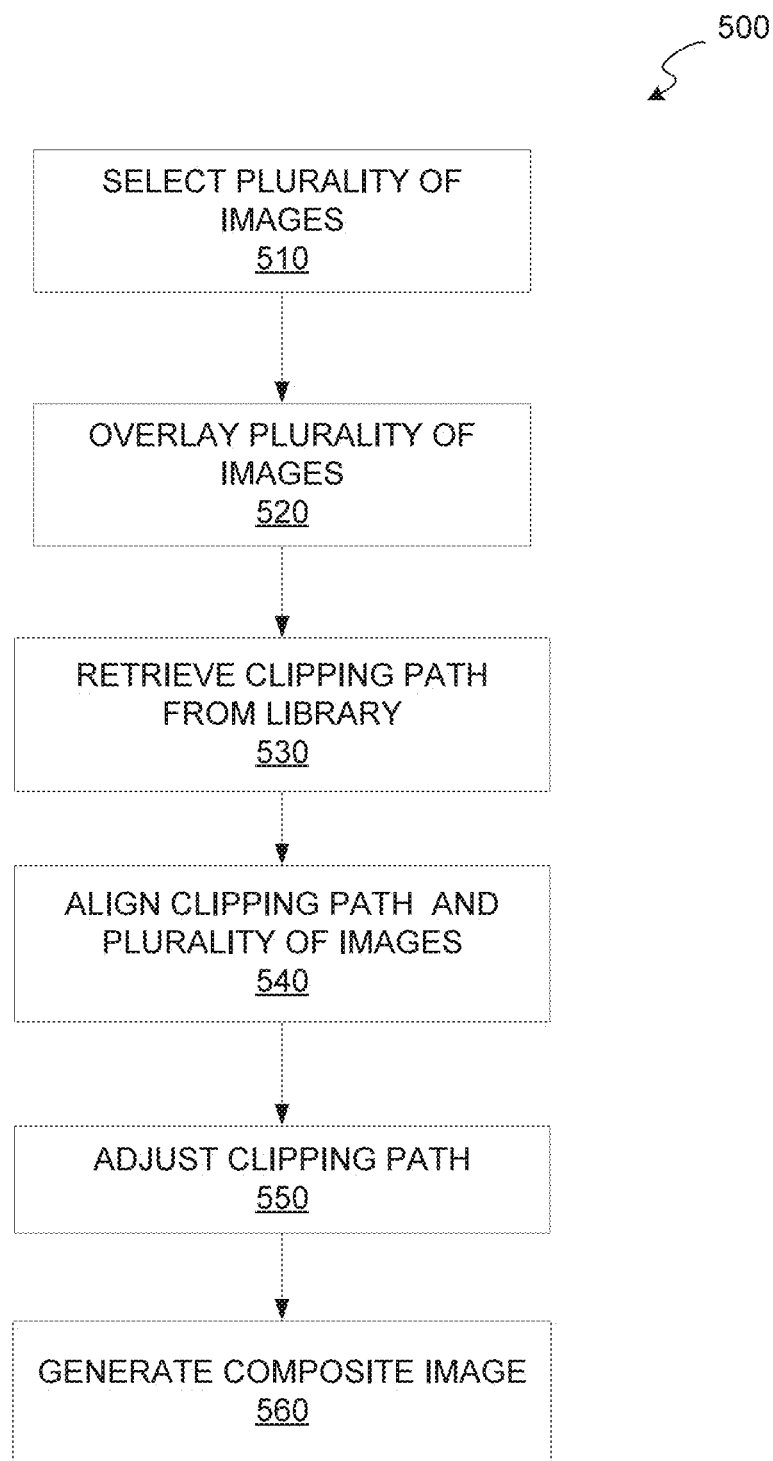
FIG. 5 is an illustration of a process for creating a composite image using a clipping path, according to an embodiment of the present disclosure.

FIG. 5 is an illustration of a method 500 for creating a composite image using a clipping path, according to an embodiment of the present disclosure. In step 510, a user selects a plurality of images that be used to compose the composite image. The plurality of images can be stored in memory of image file database or drive that is operably coupled to a processor. In some embodiments, the image database is stored on one or more media drives. In some embodiments, the image database is a remote database assessable over a network. In step 520, the user overlays the plurality of images in a general area. The precise alignment of the plurality of images is not critical at this step. In some embodiments, the plurality of images fully overlaps each other. In some embodiments, the plurality of images partially overlaps each other. In some embodiments, the plurality of images do not overlap each other. The user selects a clipping path from a library of clipping paths in step 530. The user can optionally create and store a clipping path if there are no suitable clipping paths that are already stored in the library.

The clipping path that is retrieved from the library is aligned to the top image that is overlaid over a bottom image in step 540. The top image is clipped according to the clipping path to display a portion of the bottom image. In step 550, the clipping path may be adjusted if needed based on an image size and the desired shape of the clipping path. In step 560, the composite image showing portions of the clipped images is generated. The composite image can be generated on a typesetter and/or composition system. In some embodiments, the plurality of images that form the composite image are still present, but only portions of the images are visible based on the clipping path. In some embodiments, generating the composite image includes flattening the composite image so that each image layer is merged into a single layer. After flattening, the shape of the clipping path is no longer adjustable, however, the file size for the composite image may be reduced.

Figure 6:
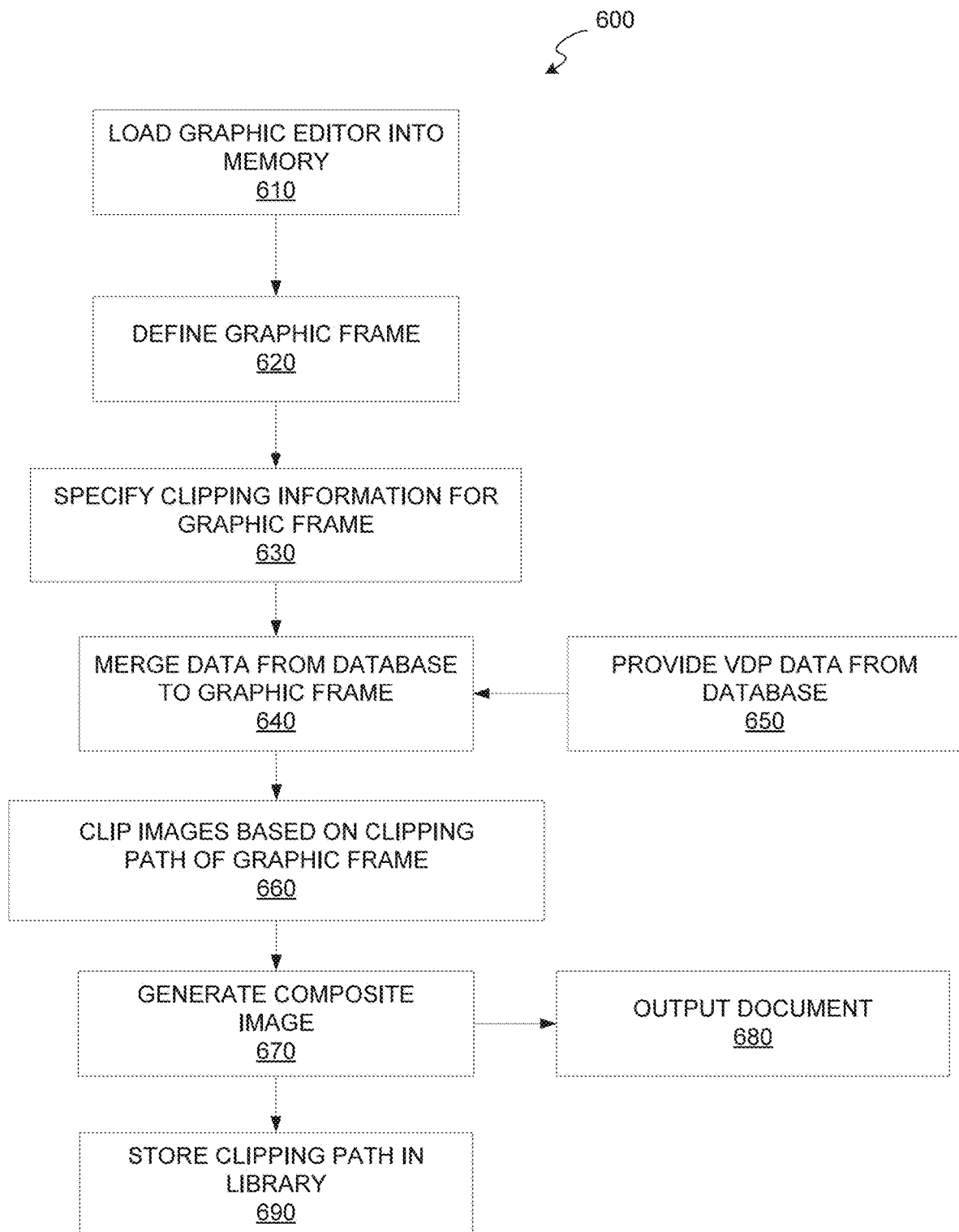
FIG. 6 is an illustration of a process for creating a document using a clipping path, according to an embodiment of the present disclosure.

FIG. 6 is an illustration of a method 600 for creating a composite image using a clipping path, according to an embodiment of the present disclosure. In step 610, the process starts with a program, like FusionPro available from PTI Marketing Technologies, being loaded into a memory of a composition system. A layout or template may be selected and loaded. In step 620, a user using a graphic clipping frame editor defines a clipping path of a graphic clipping frame. The clipping path in turn defines a clipping area. The clipping path can have three or more vertices that define the area or clipped region. The user can optionally add additional vertices to define any complex shape or area by creating straight or curved lines. In some embodiments, a user can define a plurality of areas. In some embodiments, the plurality of areas are interconnected or separated from each other. In some embodiments, a user can define a plurality of areas that partially overlay each other. In step 630, a user specifies clipping information for the clipping frame. The clipping information can include an order of overlaying the clipped images defined by the frame or clipping path. In some embodiments, the clipping information can include effects along the edges of the frame or clipping path. In step 640, the software or program merges the graphics or a plurality of images to the graphic frame. Different data records can pull in or retrieve different graphics based rules of the template. In step 650, data records are retrieved from a database of VDP records for composition. In some embodiments, the database is stored on one or more media drives. In some embodiments, the database is a remote database assessable over a network. In some embodiments, the data records are transmitted and received over a network, including for example, the internet, a wide area network and a local area network. In some embodiments, the data records are a plurality of images. In step 660, the program or software clips each graphic or image based on the clipping path of the graphic frame. In some embodiments, a user can write scripts to indicate which clipping path to select and how to apply it to the images. In step 670, the composite image showing portions of the clipped images is generated. The composite image can be generated on a typesetter and/or composition engine. In some embodiments, the plurality of images that form the composite image are still present, but only portions of the images are visible based on the clipping path. In some embodiments, generating the composite image includes flatting the composite image so that each image layer is merged into a single layer. After flattening, the shape of the clipping path is no longer adjustable, however, the file size for the composite image may be reduced. An output is created with each custom graphic clipped in the same way in each graphic frame. In some embodiments, the output is a PostScript file that is sent to a RIP for generating a printed output. In step 680, the output document is transmitted and received over a network, including for example, the internet, a wide area network and a local area network to a printing system for further processing. In step 690, the process may end by the clipping path being stored in a library of clipping paths.

Figure 7:
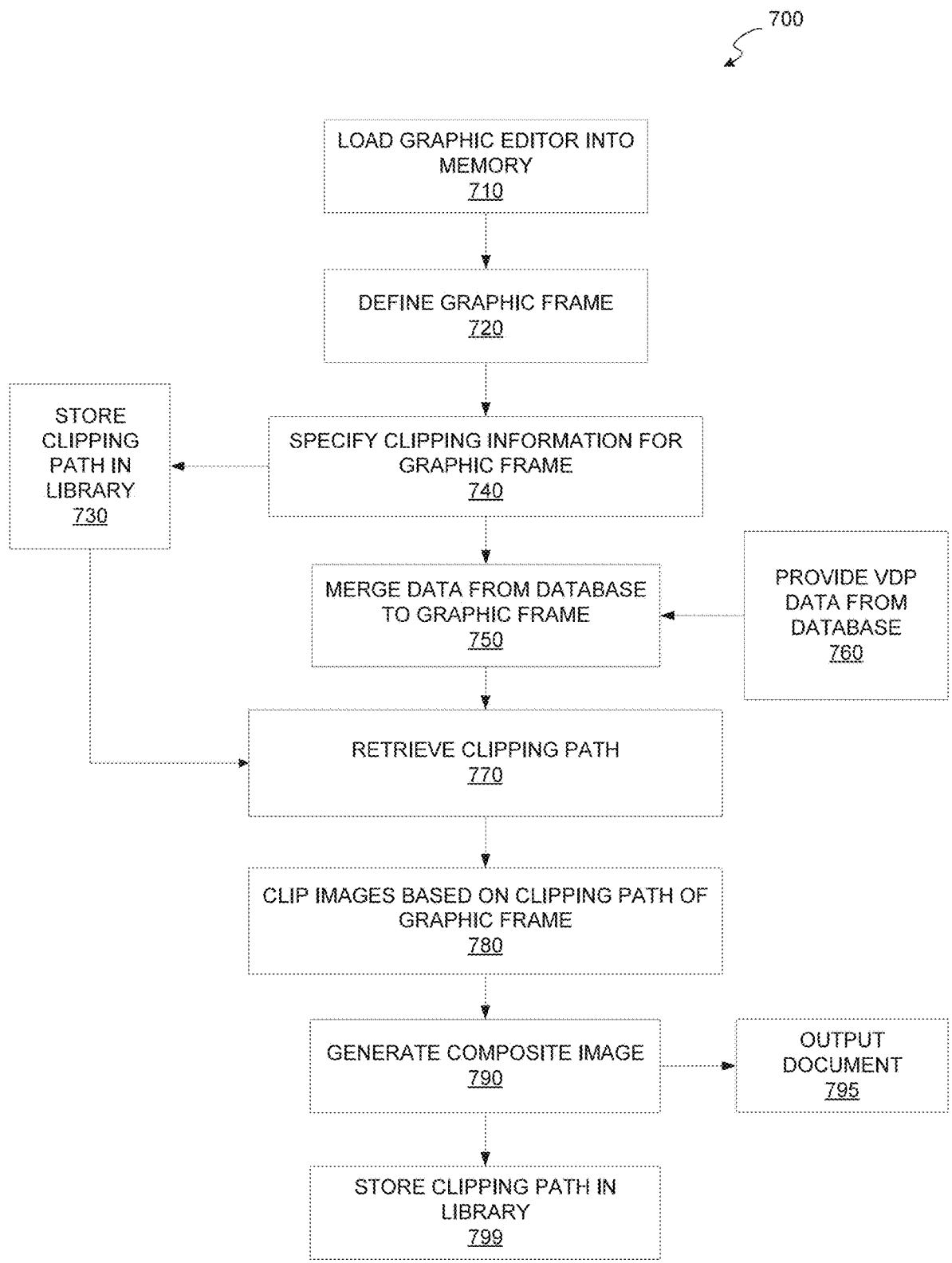
FIG. 7 is an illustration of a process for creating a document using a clipping path, according to an embodiment of the present disclosure.

FIG. 7 is an illustration of a method 700 for creating a composite image using a clipping path, according to an embodiment of the present disclosure. In step 710, the process starts with a program, like FusionPro available from PTI Marketing Technologies, being loaded into a memory of a composition system. In step 720, a user using a graphic clipping frame editor defines a clipping path of a graphic clipping frame. The clipping path in turn defines a clipping area. The clipping path can have three or more vertices that define an area. The user can optionally add additional vertices to define any complex shape or area including straight or curved lines. In some embodiments, a user can define a plurality of areas that interconnected or separated from each other. In some embodiments, a user can define a plurality of areas that partially overlay each other. In step 740, a user specifies clipping information for clipping the frame and stores a clipping path in a clipping path library 730. The clipping path library 730 may be a remote or local database that is accessible over a network, including for example, the internet, a wide area network and a local area network. The clipping information can include an order of overlaying the clipped images defined clipping path of the frame. In some embodiments, the clipping information can include effects along the edges of the frame or clipping path.

In step 750, the software or program merges in graphics or plurality of images to graphic frame. Different data records can pull in or retrieve different graphics based rules in the template. The graphics can be store in one or more separate databases. In some embodiments, the database is stored on one or more media drives. In some embodiments, the database is a remote database assessable over a network. In some embodiments, the data records are transmitted and received over a network, including for example, the internet, a wide area network and a local area network. In step 760, data records are retrieved from a database of VDP records for composition. In some embodiments, the data records are transmitted and received over a network, including for example, the internet, a wide area network and a local area network. In step 770, software selects and retrieves a clipping path for each graphic frame based on data provided. In some embodiments, a user can write scripts to indicate which clipping path to select and retrieve. In step 780, software clips each graphic based on the clipping path of the graphic frame selected in 770.

In step 790, the composite image showing portions of the clipped images is generated. The composite image can be generated on a typesetter and/or composition system. In some embodiments, the plurality of images that form the composite image are still present, but only portions of the images are visible based on the clipping path. In some embodiments, generating the composite image includes flatting the composite image so that each image layer is merged into a single layer. After flattening, the shape of the clipping path is no longer adjustable, however, the file size for the composite image may be reduced. An output is created with each custom graphic clipped in the same way in each graphic frame. In some embodiments, the output is a PostScript file that is sent to a RIP for generating a printed output. In step 795, the output document is transmitted and received over a network, including for example, the internet, a wide area network and a local area network to a printing system for further processing. In step 799, the process may end by the clipping path being stored in a library of clipping paths.

Figure 8:
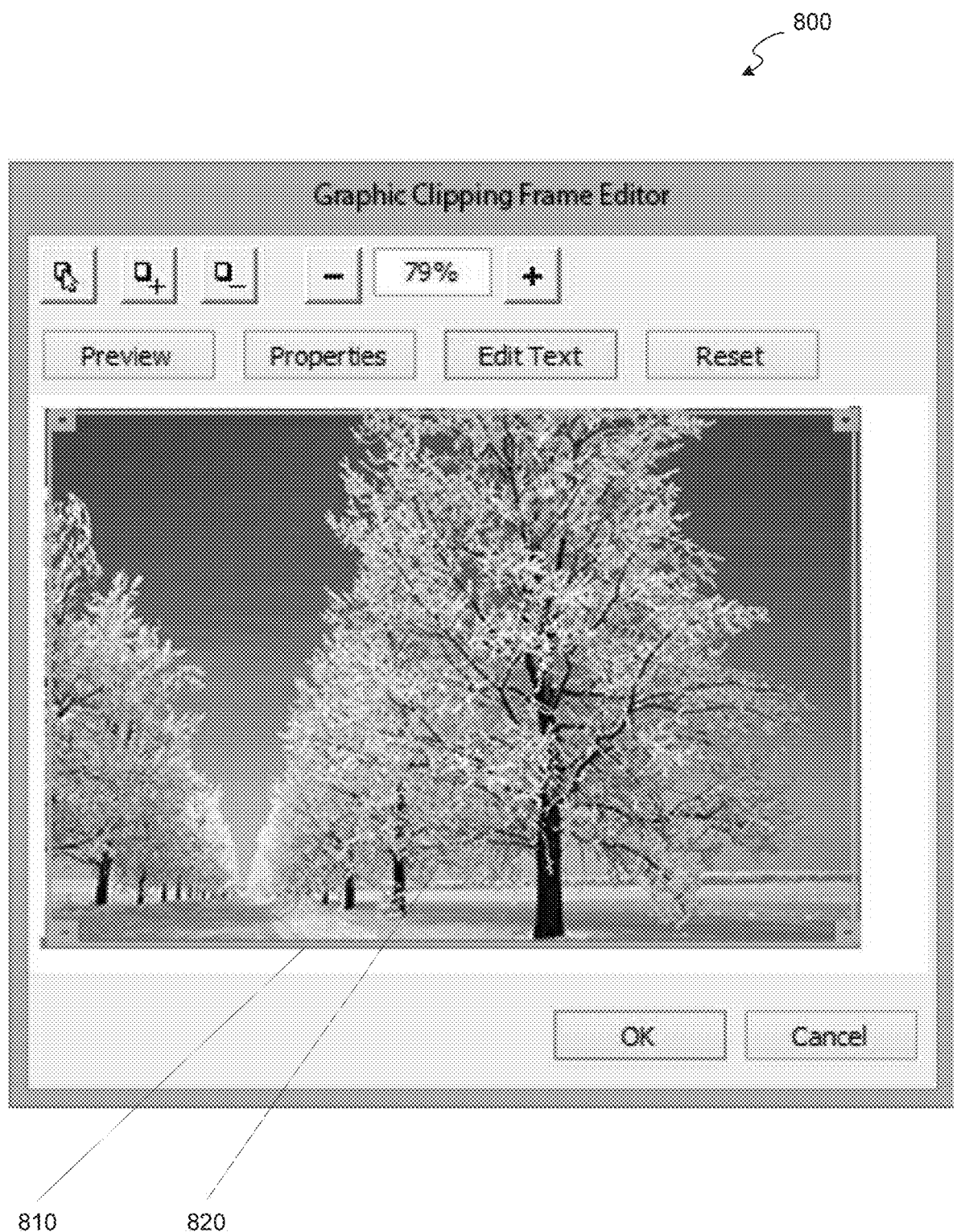
FIG. 8 is an example of an image before a clipping path is applied, according to embodiments of the present disclosure.

FIG. 8 is an example of an image within a graphic frame editor before a clipping path is applied, according to embodiments of the present disclosure. A graphic clipping frame editor 800 is used to align a clipping path 810 over a plurality of images 820. The vertices of the clipping path 810 can be repositioned by the user to adjust the shape and define the clipping area. Additional vertices can be added to increase the complexity of the clipping path 810.

Figure 9:
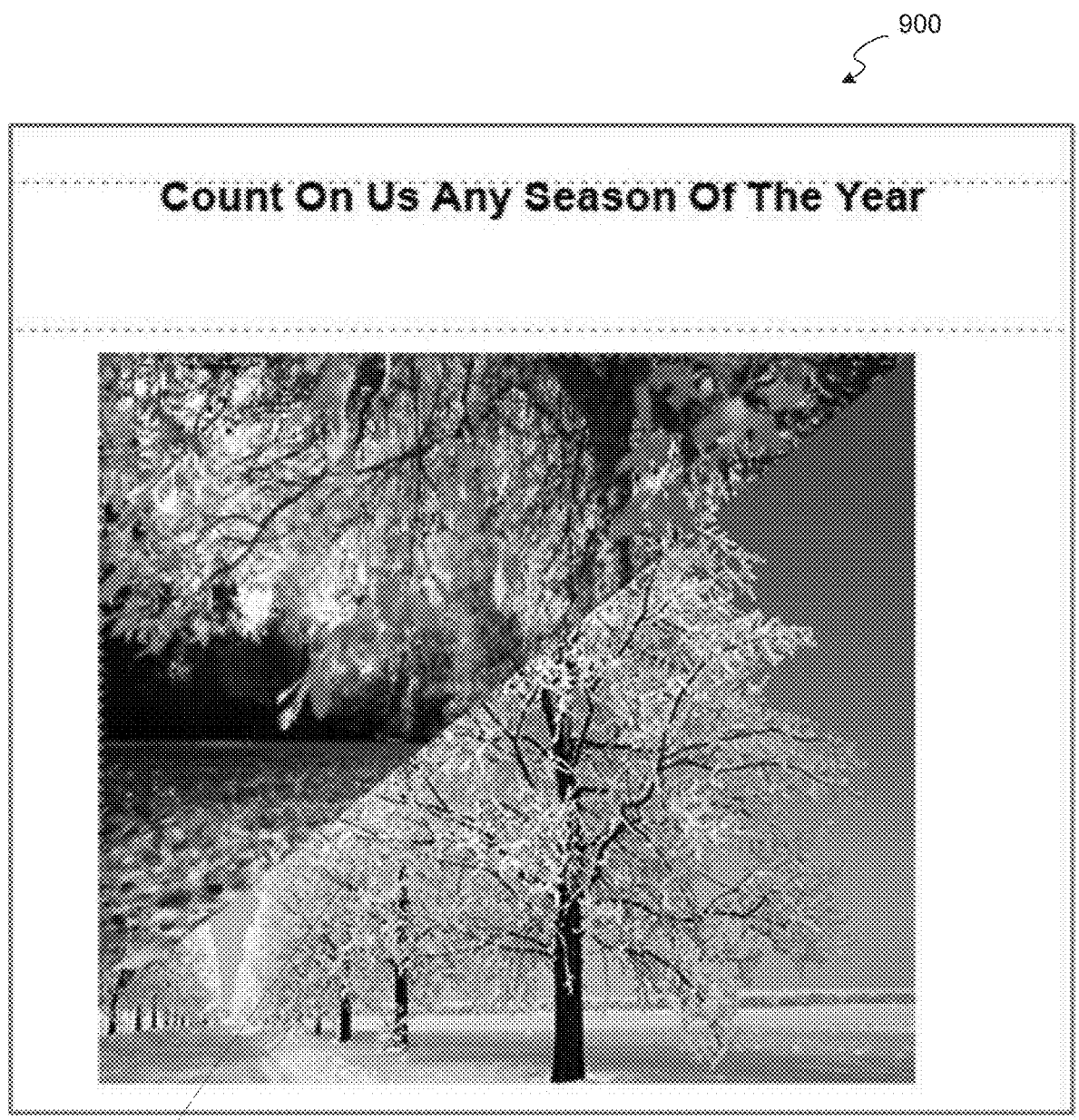
FIG. 9 is an example of a composite image after a clipping path is applied, according to embodiments of the present disclosure.

FIG. 9 is an example of a composite image 910 after a clipping path is applied, according to embodiments of the present disclosure. A portion of the clipping path is positioned diagonally through the frame to display the lower right portion of a winter scene thereby revealing an upper left portion of an autumn scene from a bottom image. Output document 900 is a sheet of paper.

Figure 10:
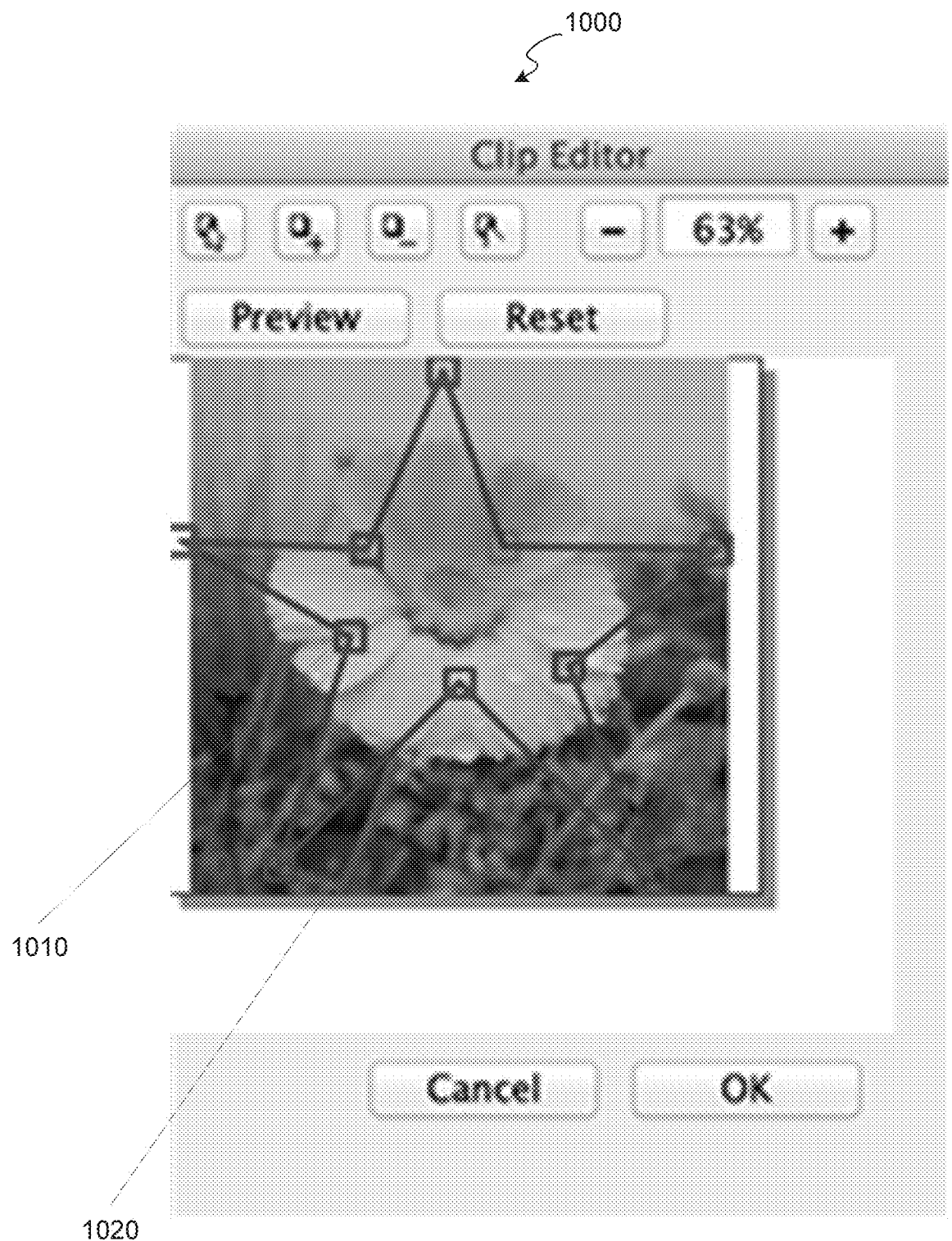
FIG. 10 is an example of a clipping path defined by a user using a graphic clipping frame editor, according to embodiments of the present disclosure.

FIG. 10 is an example of a clipping path defined by a user using a graphic frame editor 1000, according to embodiments of the present disclosure. The vertices of the clipping path 1010 have been repositioned by the user in the shape of a star. A total of ten vertices were used to define the star shaped clipping path. In one embodiment, after defining the clipping path 1010, the clipping path 1010 is saved to a clipping path library. In one embodiment, a graphic clipping frame editor 1000 is used to align a clipping path 1010 over a plurality of images 1020.

Figure 11:
FIG. 11 is an example of a composite image after a clipping path is applied, according to embodiments of the present disclosure.

FIG. 11 is another example of a composite image 1110 after a clipping path is applied, according to embodiments of the present disclosure. A star shaped clipping path was retrieved from a clipping path library and positioned over a plurality of images.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded into one or more different computers or other processors to implement various aspects of the present disclosure as discussed above.

The terms "program" or "software" or "code" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for creating a composite image, the method comprising:
    defining a graphic frame in a graphic editor, the graphic frame being a portion of a variable data publishing template layout;
    receiving, from a user of the graphic editor, a selection of a plurality of images that are for the graphic frame;
    overlaying the plurality of images within the graphic frame such that the plurality of images overlap within the graphic frame;
    retrieving, based on a set of rules from a user input, a predefined clipping path from a library that stores a plurality of predefined clipping paths, the predefined clipping path having plurality of interconnected lines and vertices that defines a border wherein the set of rules are included within the variable data publishing template layout; and
    generating the composite image in the graphic frame by clipping a portion of at least a first image from the plurality of images in accordance with the predefined clipping path such that the composite image includes a combination of at least the portion of the first image and at least a portion of a second image from the plurality of images.

2. The method of claim 1, wherein the clipping causes the portion of the first image and the portion of the second image to be visible in the graphic frame.

3. The method of claim 1, wherein the library is a remote database assessable over a wide area network.

4. The method of claim 1, wherein the border defined by the predefined clipping path forms a polygon that is not a rectangle.

5. The method of claim 1, wherein the plurality of interconnected lines defining the border of the predefined clipping path includes at least one Bezier curved line.

6. The method of claim 1, further comprising:
composing a print file, the variable data template layout including the composite image, and composition options.

7. The method of claim 6, wherein the variable data template layout is populated with data from the data file during composing the print file.

8. The method of claim 7, wherein composing the print file, the variable data template layout including the composite image, and the composition options is performed using a composition engine.

9. The method of claim 7, further comprising:
sending, the variable data template layout including the composite image, and the composition options to a composition engine from a typesetter system.

10. The method of claim 1, further comprising:
rendering a final document including the composite image; and
printing the final document on printable media using a printing system.

11. The method of claim 1, further comprising:
rendering a final document including the composite image; and
displaying the final document on a display device.

12. The method of claim 6, wherein the print file includes one or more pre-rasterized objects and is in the form of one of Java, C, C#, C++, scripting languages, PostScript, PDF, PDF/VT, PPML, XML, VPS, VDX, and VIPP file.

13. The method of claim 1, wherein generating the composite image in the graphic editor further includes flattening the composite image.

14. The method of claim 1, wherein the predefined clipping path is a user-defined clipping path.

15. The method of claim 1, further comprising:
retrieving variable data customer data from a database, each item of variable data customer data associated with a customer from a plurality of customers; and
generating at least one print file that includes a representation of a plurality of final documents, each final document from the plurality of final documents including a rendering of the composite image produced by applying an item of variable customer data from the plurality of variable customer data to the set of rules, a final document from the plurality of final documents different from at least one other final document from the remaining final documents.

16. The method of claim 1, wherein the clipping the portion of at least the first image from the plurality of images in accordance with the predefined clipping path includes clipping the portion of at least the first image that is selected based on a rule associated with the first image.

17. A method for creating a composite image, the method comprising:
loading a graphic editor into a memory of a composition system;
defining a graphic frame in the graphic editor, the graphic frame being a portion of a variable data publishing template layout;
receive, from a user of the graphic editor, a selection of a plurality of images that are stored in a database for the graphic frame;
overlaying the plurality of images within the graphic frame such that the plurality of images within the graphic frame;
retrieving, using the graphic editor loaded into the memory of the composition system, a predefined clipping path wherein the graphic editor retrieves the predefined clipping path from a library that stores a plurality of predefined clipping paths and based on a set of rules, the predefined clipping path having a plurality of interconnected lines and vertices that define a border, the graphic frame and the set of rules being included in the variable data publishing template layout;
specifying clipping information for the graphic frame, the clipping information including an order for overlaying a plurality of images within the graphic frame;
merging the plurality of images within the graphic frame by retrieving the plurality of images from the at least one database and overlaying the plurality of images in the order specified by the clipping information;
clipping the plurality of images within the graphic frame based on the plurality of clipping path; and
generating the composite image in the graphic frame and from portions of the plurality of images based on the retrieved predefined clipping path by clipping at least a portion of a first image from the plurality of images to reveal at least a portion of a second image from the plurality of images in accordance with the retrieved predefined clipping path.

18. The method of claim 17, wherein the clipping causes the portion of the second image to be visible in the composite image.

19. The method of claim 17, wherein:
the at least one database includes a plurality of databases;
the first image is stored in a first database from the plurality of databases; and
the second image is stored in a second database from the plurality of databases.

20. The method of claim 17, further comprising:
retrieving variable data publishing data from a database; and
selecting, based on the set of rules and using the variable data publishing data as an input, the predefined clipping path for the graphic frame based on the clipping information for the graphic frame.

21. The method of claim 17, wherein the predefined clipping path is a user defined clipping path.

22. The method of claim 17, wherein the clipping at least the portion of the first image from the plurality of images to reveal at least the portion of the second image includes clipping least the portion of the first image that is selected based on a rule associated with the first image.

* * * * *